United States Patent [19]

Otsuki et al.

[11] Patent Number: 4,543,406
[45] Date of Patent: Sep. 24, 1985

[54] CATHODE-DEPOSITING ELECTRODEPOSITION COATING COMPOSITION

[75] Inventors: Yutaka Otsuki; Hiroyoshi Omika; Akio Oshima, all of Yokohama; Yoshihiko Araki, Tokyo; Yasuyuki Tsuchiya, Hirakata, all of Japan

[73] Assignees: Nippon Paint Co., Ltd., Osaka; Nippon Oil Company, Ltd., Tokyo, both of Japan

[21] Appl. No.: 661,177

[22] Filed: Oct. 15, 1984

[51] Int. Cl.⁴ .................. C08L 63/10; C08L 63/08
[52] U.S. Cl. .................. 528/111.5; 525/111.5; 525/112; 525/113; 525/117; 528/113
[58] Field of Search ............ 525/111.5, 113, 112, 525/117; 528/111.5, 113

[56] References Cited

U.S. PATENT DOCUMENTS

| | | | |
|---|---|---|---|
| 3,773,702 | 11/1973 | Ohashi | 525/112 X |
| 4,088,708 | 5/1978 | Riew | 525/113 |
| 4,129,670 | 12/1978 | Riew | 528/113 X |
| 4,251,414 | 2/1981 | Nakada et al. | 525/113 X |
| 4,260,700 | 4/1981 | Cassutt et al. | 525/113 |
| 4,486,571 | 12/1984 | Holubka | 525/113 X |

*Primary Examiner*—Earl Nielsen
*Attorney, Agent, or Firm*—Wenderoth, Lind & Ponack

[57] ABSTRACT

A cathode-precipitating electrodeposition coating having excellent low-temperature curability, said composition consisting essentially of (A) 100 parts by weight of a high molecular compound having a molecular weight of 500 to 10,000 and containing carbon-carbon double bonds with an iodine value of 50 to 500 and 30 to 300 millimoles of amino groups per 100 g, (B) 10 to 200 parts by weight of a product of reaction of a diglycidyl compound represented by the general formula

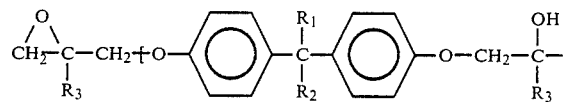

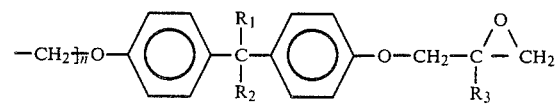

wherein $R_1$, $R_2$ and $R_3$ represent a hydrogen atom or a methyl group and n represents an integer of from 0 to 20, with at least one organic acid component selected from the group consisting of (a) both an alpha,beta-unsaturated dicarboxylic acid and an alpha,beta-unsaturated monocarboxylic acid, (b) an unsaturated fatty acid containing at least 10% by weight of carbon-carbon conjugated double bonds and having a molecular weight of 100 to 350, and (c) an alpha,beta-unsaturated monocarboxylic acid, a 1,2-dicarboxylic acid anhydride, and a monoepoxy compound in this sequence, and (C) 0.005 to 1.0 part by weight as metal of a manganese salt of an organic acid or manganese dioxide.

8 Claims, No Drawings

CATHODE-DEPOSITING ELECTRODEPOSITION COATING COMPOSITION

This invention relates to a cathode-depositing electrodeposition coating composition having excellent curability at low temperatures.

A resin having a certain basic group produces a cation in water, and in an electrodeposition process, is deposited on the cathode. Conventional anode-depositing electrodeposition paints obtained by neutralizing resins having acidic groups with bases to make them water-soluble have the essential defect that a metal to be coated dissolves in coating baths containing the paints. Cathode-depositing paints of the aforesaid type are free from this defect and can overcome various problems attributed to it.

We studied such cathode-depositing paints, and found that resins for cathode-depositing electrodeposition paints capable of giving excellent film properties can be obtained by introducing an amino group into a synthetic polymer of a low degree of polymerization having a carbon-carbon double bond (component A), for example a high-molecular-weight compound having an unsaturated group such as liquid polybutadiene, and neutralizing the polymer with an acid. We applied this technique for a patent (Japanese Laid-Open Patent Publications Nos. 119727/1976, 147638/1977 and 16048/1978).

A cathode-depositing electrodeposition coating composition containing the aforesaid resin as a film-forming component cures mainly by the oxidative polymerization of the unsaturated group of the resin and gives coated films having excellent properties. To cure it within a practical period of time, however, relatively high baking temperatures are required. We made investigations in order to lower the baking temperature, and found that by adding a metal dryer (component C) such as a water-soluble manganese salt (Japanese Laid-Open Patent Publication No. 14244/1978). A large amount of the dryer is required in this method and electrodepositing properties such as throwing power are aggravated. Furthermore, problems such as the tendency toward roughening of the coated surface arise.

We also found a method of curing at relatively low baking temperatures by introducing a highly reactive acrylic (methacrylic) double bond into the resin, and applied it for a patent (Japanese Laid-Open Patent Publication No. 151777/1981). By adding a water-soluble manganese salt in this case, there can be obtained a cathode-depositing electrodeposition paint having excellent properties and capable of being cured at relatively low temperatures of 160° C.

In recent years, however, it has been desired to develop paints having still lower baking temperatures in order to save energy.

It is an object of this invention therefore to improve the curability of the aforesaid resin and provide a cathode-depositing electrodeposition paint having low-temperature curability and excellent corrosion resistance.

We have made various investigations in order to achieve the above object, and found that the baking temperature can be further lowered by introducing a large amount of a highly reactive double bond which accelerates curing into a compound (component B) added for the purpose of increasing corrosion resistance.

According to this invention, there is provided a cathode-depositing electrodeposition coating having excellent low-temperature curability, said composition consisting essentially of (A) 100 parts by weight of a high molecular compound having a molecular weight of 500 to 10,000 and containing carbon-carbon double bonds with an iodine value of 50 to 500 and 30 to 300 millimoles of amino groups per 100 g, (B) 10 to 200 parts by weight of a product of reaction of a diglycidyl compound represented by the general formula

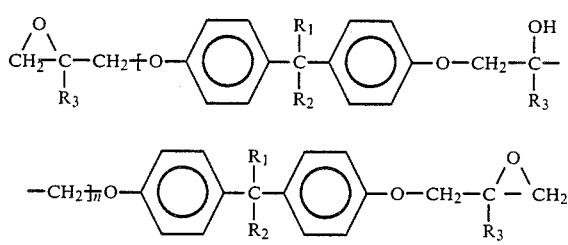

wherein $R_1$, $R_2$ and $R_3$ represent a hydrogen atom or a methyl group and n represents an integer of from 0 to 20, with at least one organic acid component selected from the group consisting of (a) both an alpha,beta-unsaturated dicarboxylic acid and an alpha,beta-unsaturated monocarboxylic acid, (b) an unsaturated fatty acid containing at least 10% by weight of carbon-carbon conjugated double bonds and having a molecular weight of 100 to 350, and (c) an alpha,beta-unsaturated monocarboxylic acid, a 1,2-dicarboxylic acid anhydride represented by the general formula

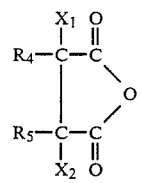

wherein $R_4$ and $R_5$ represent a hydrogen atom or an alkyl group having 1 to 20 carbon atoms, provided that either $R_4$ or $R_5$ may contain one molecule of a carboxylic acid group, and $R_4$ and $R_5$ together may be of a 6-membered ring structure or a heterocyclic structure having a 5-membered ring and a 6-membered ring, said ring structure optionally containing an unsaturated group; and $X_1$ and $X_2$ represent a hydrogen atom, an organic group having 1 to 10 carbon atoms, or a bond, provided that when $X_1$ and $X_2$ are bonds, the carbon atoms to which $X_1$ and $X_2$ are attached will together form a double bond, and a monoepoxy compound represented by the following formula

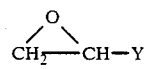

wherein Y represents a hydrogen atom or an organic group having 1 to 10 carbon atoms, in this sequence, and (C) 0.005 to 1.0 part by weight as metal of a manganese salt of an organic acid or manganese dioxide.

A high molecular compound having a molecular weight of 500 to 10,000 and containing carbon-carbon double bonds with a iodine value of 50 to 500, which is a starting material for component A, can be produced by known methods.

A typical method comprises anionic polymerization or copolymerization of a conjugated diolefin having 4 to 10 carbon atoms alone or such diolefins with each other or such a diolefin with not more than 50 mole %, based on the conjugated diolefin, of an aromatic vinyl monomer such as styrene, alpha-methylstyrene, vinyltoluene or divinylbenzene at a temperature of 0° to 100° C. in the presence of an alkali metal or an organoalkali metal compound as a catalyst. In order to obtain a light-colored low polymer having a low gel content by controlling its molecular weight, there are conveniently used, for example, a chain transfer polymerization method involving the use of a compound having an alkylaryl group such as toluene as a chain transfer agent (U.S. Pat. No. 2,789,090), a living polymerization method in a tetrahydrofuran solvent using a polynuclear aromatic compound such as naphthalene as an activator and an alkali metal such as sodium as a catalyst (Japanese Patent Publications Nos. 17485/1967 and 27432/1968), and a polymerization method in which an aromatic hydrocarbon such as toluene or xylene is used as a solvent, a dispersion of an alkali metal such as sodium is used as a catalyst and the molecular weight is controlled by adding an ether such as dioxane (Japanese Patent Publications Nos. 7446/1957, 1245/1963 and 10188/1959). There can also be used a low polymer produced by coordination anionic polymerization in the presence of an acetylacetonate compound of a metal of Group VIII such as cobalt or nickel and an alkylaluminum halide as a catalyst (Japanese Patent Publications Nos. 507/1970 and 80300/1971).

The component (A) of this invention, i.e. the high molecular compound having a molecular weight of 500 to 10,000 and containing carbon-carbon double bonds with an iodine value of 50 to 500 and 30 to 300 millimoles of amino groups per 100 g can be produced by known conventional methods using the aforesaid starting high molecular compound.

For example, there may be used a method comprising causing maleic anhydride to add to the high molecular compound containing carbon-carbon double bonds, and thereafter reacting the compound with a diamine compound of the general formula

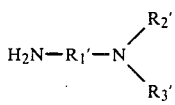

wherein $R_1'$ represents a hydrocarbon group having 1 to 20 carbon atoms, and $R_2'$ and $R_3'$ represent a hydrogen atom or a hydrocarbon group having 1 to 20 carbon atoms which may partly be substituted by a hydroxyl group, to introduce the amino group (Japanese Laid-Open Patent Publications Nos. 119727/1976, 147638/1977, 8629/1978 and 63439/1978), and a method which comprises epoxidizing the high molecular compound containing carbon-carbon double bonds with a peroxide such as hydrogen peroxide or a peracid, and then causing a primary or secondary amine to add to the epoxidized compound (Japanese Laid-Open Patent Publications Nos. 16048/1978 and 117030/1978).

Preferably, the component (A) is produced by epoxidizing a high molecular compound having a molecular weight of 500 to 5,000 and containing carbon-carbon double bonds as the starting material with an iodine value of 100 to 500 to prepare an epoxidized high-molecular-weight compound containing 3 to 12% by wight of oxirane oxygen, reacting some of the epoxy groups of the resulting compound with a basic amine compound represented by the general formula

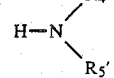

wherein $R_4'$ and $R_5'$, independently from each other, represent a hydrocarbon group having 1 to 10 carbon atoms, and each group may partly be substituted by a hydroxyl group, or $R_4'$ and $R_5'$ together may form a ring structure, and thereafter, reacting a part or the whole of the remaining epoxy groups with an alpha,-beta-unsaturated monocarboxylic acid represented by the general formula

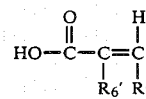

wherein $R_6'$ and $R_7'$ represent a hydrogen atom or a methyl group, and at least one of them is a hydrogen atom.

An unsaturated fatty acid having a molecular weight of 100 to 350 and containing at least 10% by weight of carbon-carbon conjugated double bonds may be used in place of a part of the alpha,beta-unsaturated monocarboxylic acid used.

There can also be used a high molecular compound produced by a method which comprises causing maleic anhydride to add to the high molecular compound having carbon-carbon double bonds and then reacting the addition product with a diamine compound represented by the general formula

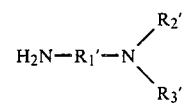

wherein $R_1'$, $R_2'$ and $R_3'$ are as defined herinabove (Japanese Laid-Open Patent Publications Nos. 119727/1976, 147638/1977, 8629/1978 and 63439/1978).

Addition of component (B) to component (A) of this invention leads to a marked improvement in the corrosion resistance and curability of the final coating composition.

The content of the component (B) is 10 to 200 parts by weight, preferably 30 to 100 parts by weight, per 100 parts by weight of the resin (A). If the content of the component (B) is smaller, the improvement of the corrosion resistance is not sufficient. If it is larger than the specified limit, the water dispersibility of the resulting composition becomes poor.

To obtain the component (B) of the composition of this invention, a diglycidyl compound represented by the general formula

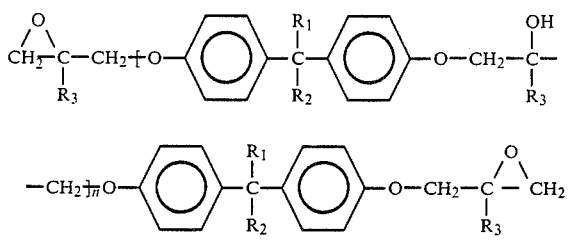

wherein $R_1$, $R_2$ and $R_3$ represent a hydrogen atom or a methyl group, and n represents an integer of from 0 to 20, is used as a starting material. This diglycidyl compound can be prepared usually by etherifying a bisphenol with epichlorohydrin in the presence of an alkali. Examples of the bisphenol compounds include 2,2-bis(4'-hydroxyphenyl)propane, 1,1-bis(4'-hydroxyphenyl)ethane and 1,1-bis(4'-hydroxyphenyl)isobutane. In many cases, diglycidyl compounds having a slightly higher molecular weight can be synthesized by further reacting the diglycidyl ether with bisphenols, etc. and reacting the product further with epichlorohydrin. Such diglycicyl compounds having a higher molecular weight can be used in this invention.

The compounds as component (B) of this invention are derived from the diglycidyl compounds of the above general formula obtained by the above-exemplified method or other suitable methods, and are roughly divided into the following compounds (a), (b) and (c).

(1) Compounds (a) of component (B)

These compounds are produced by reacting the diglycidyl compound with an alpha,beta-unsaturated dicarboxylic acid represented by the general formula

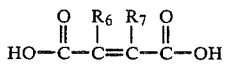

wherein $R_6$ and $R_7$ represent a hydrogen atom or an alkyl group having 1 to 10 carbon atoms, the proportion of the unsaturated carboxylic acid being 0.2 to 0.8 mole per mole of the diglycidyl compund, at a temperature of 0° to 200° C., preferably 50° to 150° C., and thereafter reacting the product with 1.6 to 0.4 moles of an alpha,-beta-unsaturated monocarboxylic acid represented by the general formula

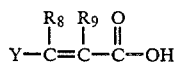

wherein $R_8$ and $R_9$ represent a hydrogen atom or a methyl group, Y represents a hydogen atom or an organic group having 1 to 20 carbon atoms, particularly a methyl group or group of the formula:

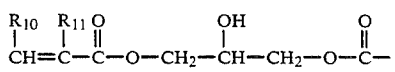

or

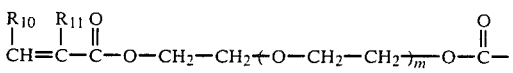

in which $R_{10}$ and $R_{11}$ represents a hydrogen atom or a methyl group, and m represents an integer of from 0 to 10, or reacting the diglycicyl compound simultaneously with the alpha,beta-unsaturated dicarboxylic acid and the alpha,beta-unsaturated monocarboxylic acid.

Fumaric acid, maleic acid or a mixture of these may, for example, be used as the alpha,beta-unsaturated dicarboxylic acid.

Examples of the alpha,beta-unsaturated monocarboxylic acid that can be used include, acrylic acid, methacrylic acid, crotonic acid, the reaction product of equimolar proportions of fumaric acid and glycidyl (meth)acrylate, the reaction product of equimolar proportions of maleic anhydride and hydroxy (meth)acrylate, and mixtures of these.

(2) Compounds (b) of component (B)

These compounds are prepared by reacting the aforesaid glycidyl compound with an unsaturated fatty acid having a molecular weight of 100 to 350 and containing at least 10% by weight of carbon-carbon conjugated double bonds at a temperature of preferably 0° to 200° C., more preferably 50° to 150° C.

Examples of the unsaturated fatty acid suitable for the production of the compund (b) are sorbic acid, tung oil fatty acid, sunflower oil fatty acid and dehydrated castor oil fatty acid. Conjugated fatty acids obtained by isomerizing soybean fatty acid and linseed fatty acid can also be used. Purified eleostearic acid and conjugated linoleic acid can also be used. A mixture containing more than 10% by weight in total of conjugated double bonds prepared by mixing an unsaturated fatty acid containing not more than 10% by wight of carbon-carbon conjugated double bonds with an unsaturated fatty acid having a large amount of conjugated double bonds may also be used. Of these, dehydrated castor oil fatty acid is advantageous and preferred because it is easily available industrially.

The proportion of the unsaturated fatty acid containing conjugated double bonds is preferably 2.1 to 0.3 moles, more preferably 2.1-1.0 moles, per molecule of the diglycidyl compound.

Together with the unsaturated fatty acid containing conjugated double bonds, an alpha,beta-unsaturated carboxylic acid represented by the general formula

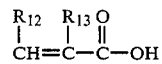

wherein $R_{12}$ and $R_{13}$ represent a hydrogen atom or a methyl group, may be used in a proportion of up to 1.80 moles, preferably up to 1.1 moles, per molecule of the diglycidyl compound. Examples of the alpha,beta-unsaturated carboxylic acid used herein are acrylic acid, methacrylic acid, crotonic acid, cinnamic acid, and mixtures of these.

(3) Compounds (c) of component (B)

These compounds are produced by reacting the glycidyl compound with an alpha,beta-unsaturated monocarboxylic acid represented by the general formula

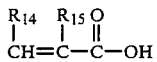

wherein $R_{14}$ and $R_{15}$ represent a hydrogen atom or a methyl group, at a temperature of 0° to 200° C., preferably 50° to 150° C., the proportion of the unsaturated monocarboxylic acid being substantially 2 moles per mole of the diglycidyl compound, thereafter reacting the resinous reaction product of the diglycidyl compound and the alpha,beta-unsaturated monocarboxylic acid with a 1,2-dicarboxylic acid anhydride represented by the general formula

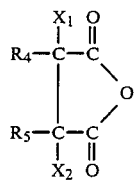

wherein $R_4$ and $R_5$ represent a hydrogen atom or an alkyl group having 1 to 20 carbon atoms, provided that either $R_4$ or $R_5$ may contain one molecule of a carboxylic acid group, and $R_4$ and $R_5$ together may be of a 6-membered ring structure or a heterocyclic structure having a 5-membered ring and a 6-membered ring, said ring structure optionally containing an unsaturated group; and $X_1$ and $X_2$ represent a hydrogen atom, an organic group having 1 to 10 carbon atoms, or a bond, provided that when $X_1$ and $X_2$ are bonds, the carbon atoms to which $X_1$ and $X_2$ are attached may together form a double bond, to form a half ester with the hydroxyl group and form a resin having a carboxylic acid group, and then esterifying the resin with a monoepoxy compound represented by the general formula

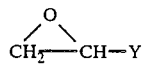

wherein Y is as defined above, the amount of the monoeoxy compound being equimolar to the carboxylic acid group in the resin.

Preferably, the 1,2-dicarboxylic acid anhydride is used in an amount of 1 to 4 molecules, particularly 2 to 4 molecules, per molecule of the diglycidyl compound.

Examples of the 1,2-dicarboxylic acid anhydride that can be used include phthalic anhydride, trimellitic anhydride, maleic anhydride, 4-methyltetrahydrophthalic anhydride, and mixtures of these.

Examples of the monoepoxy compound include 1,2-butene oxide, allyl glycicyl ether, glycidyl methacrylate, and mixtures of these.

In performing the reactions for the production of the three types of compounds (a), (b) and (c) of component (B), it is preferred to add 0.01 to 1.0% of a radical polymerization inhibitor such as hydroquinone, methylhydroquinone and N-phenyl-N'-isopropyl-p-phenylenediamine for inhibition of side reactions, and to use a suitable catalyst such as a tertiary amine or a quaternary ammonium salt. These reactions can be carried out in the presence or absence of a solvent. When the solvent used, it is advantageous in practice to use a suitable amount of solvents inert to the reactions and capable of being used in electrodeposition paints, for example a solvent such as ethyl Cellosolve, butyl Cellosolve, ethyl Cellosolve acetate and methyl isobutyl ketone, and mix the component (B) with the components (A) and (C) without removing the solvent after the reaction, and thus utilize the mixture in electrodeposition paints.

In the present invention, it is preferred that substantially all of the groups

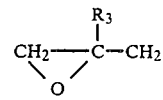

in the molecules of the diglycidyl compound react with the alplha,beta-unsaturated dicarboxylic acid and the alpha,beta-unsaturated monocarboxylic acid and change to the groups of the formula

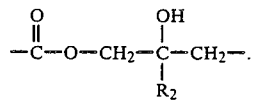

If the groups

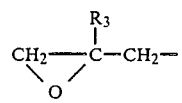

remain in large amounts, they undesirably react with the basic groups of the resin (A) at the time of water-solubilizing the composition with an acid and gellation occurs. As a result, the viscosity of the composition becomes extremely high to impair water solubilization. Even if water solubilization can be effected, the aqueous solution changes with time, and constant electrodeposition properties or electrodeposited films of constant quality cannot be obtained.

Epoxy resins of the bisphenol type have previously been known to have excellent corrosion resistance, and attempts have been made to impart curability to these resins by leaving some of the epoxy groups (Japanese Patent Publications Nos. 23807/1969 and 15860/1976) or using blocked isocyanate compounds as curing agents. However, such paints require high temperatures of, for example, more than 200° C. in order to obtain practical film hardness. Another defect is that even when curing can be carried out at relatively low temperatures, the baking temperature can be selected only from a narrow range.

Under practical electrodeposition conditions, those bisphenol-type epoxy resins which have a high molecular weight to some extent, and this naturally tends to result in coated films lacking suppleness. Furthermore, when a blocked isocyanate is used for a resin containing carbon-carbon double bonds, polymerization during baking is inhibited and a coated film having satisfactory properties are difficult to obtain.

Accordingly, it is indeed surprising that by the present invention, the compound (B) resulting from the conversion of substantially all of the groups of the formula

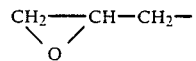

into the groups

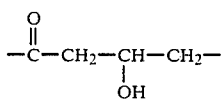

can be used as one component of a cathode-depositing electrodeposition paint together with the resin (A), and consequently, the corrosion resistance of the resin (A) can be markedly improved without impairing its excellent curability and film properties.

Addition of 0.005 to 1.0 part, as metal, of a manganese salt of an organic acid or manganese dioxide (component (c)) remarkably promotes curability and gives a cathode-depositing electrodeposition paint. Examples of the manganese salt of an organic acid include water-soluble manganese salts such as manganese formate, manganese acetate and manganese lactate, manganese naphthenate, manganese octylate and oil-soluble manganese salts of monoesters of 1,2-dicarboxylic acids represented by the general formula

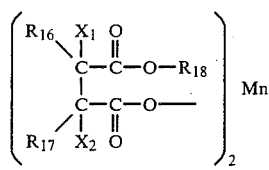

wherein $R_{16}$ and $R_{17}$ represent a hydrogen atom or an alkyl group having 1 to 20 carbon atoms, provided that $R_{16}$ and $R_{17}$ may together be of a 6-membered ring structure or a heterocyclic structure containing a 5-membered ring and a 6-membered ring, said ring structure optionally containing an unsaturated group, $R_{18}$ respresents an organic group having 1 to 20 carbon atoms, which may contain ether linkages, ester linkages and unsaturated groups, and $X_1$ and $X_2$ represent an organic group having 1 to 10 carbon atoms or a bond, and when $X_1$ and $X_2$ are bonds, the carbon atoms to which $X_1$ and $X_2$ are attached may together form a double bond.

If the amount of the manganese salt of an organic acid or manganese dioxide as component (C) is less than 0.005 part by weight, the effect of promoting curability is small. If it is larger than 1.0 part by weight, the curability of the resulting resin composition is good, but its water dispersibility and corrosion resistance are undesirably reduced. The preferred range is 0.01 to 0.5 part by weight as metal.

To dissolve or disperse the composition composed of the components (A), (B) and (C) in this invention, it is preferred to mix the components (A), (B) and (C), neutralizing the mixture with 0.1 to 2.0 moles, preferably 0.2 to 1.0 mole, per mole of the amino groups of component (A) of a water-soluble organic acid such as acetic acid, propionic acid or lactic acid, and then dissolve it in water.

In dissolving or dispersing the composition of this invention in water, it is preferred to use 10 to 100 parts by weight, per 100 parts by weight of the resin composition, of an organic solvent which is water-soluble and can dissolve various resin compositions, in order to facilitate dissolving or dispersing, increase the stability of the aqueous solution, and improve the flowability of the resin and the smoothness of the coated film. Examples of such an organic solvent includes ethyl Cellosolve, propyl Cellosolve, butyl Cellosolve, ethylene glycol dimethyl ether, diethylene glycol dimethyl ether, diacetone alcohol, 4-methoxy-4-methylpentanone-2, and methyl ethyl ketone.

The cathode-depositing electrodeposition coating composition of this invention may further contain one or more of pigments such as iron oxide, lead oxide, strontium chromate, carbon black, titanium dioxide, talc, aluminum silicate and barium sulfate.

These pigments may be directly added to the composition of this invention. It is also possible to add a large amount of such a pigment to a part of an aqueous dispersion or solution of the component (A) obtained by neutralizing the component (A) and dispersing or dissolving th component (a) in water to form a paste-like master batch. This paste-like pigment master batch may be added to the composition of this invention.

The following Examples and Comparative Examples illustrate the present invention more specifically. The properties of the coated films in these examples were tested in accordance with JIS-K-5400.

PRODUCTION OF COMPONENT (A)
[PRODUCTION EXAMPLES 1 ∝ 3]

PRODUCTION EXAMPLE 1

Nisseki Polybutadiene B-1,800 (number average molecular weight 1800, 1,2-bond 64%) was epoxidized with peracetic acid to form epoxidized polybutadiene ($E_1$) having an oxirane oxygen content of 6.5%.

A three-liter separable flask was charged with 1,000 g of the epoxidized polybutadiene ($E_1$), 358 g of ethyl Cellosolve and 75.1 g of methylethanolamine, and they were reacted at 150° C. for 6 hours. After the reaction, the reaction mixture was cooled to 120° C., and a mixture of 79.2 g of acrylic acid, 7.2 g of hydroquinone and 27 g of ethyl Cellosolve was added. They were reacted at 120° C. for 4 hours to produce a resin solution ($A_1$) as the component (A) of this invention.

This resin solution had an amine value of 67.5 mmoles/100 g, an acid value of 9.9 mmoles/100 g and a solids concentration of 75% by weight.

PRODUCTION EXAMPLE 2

Nisseki Polybutadiene B-2000 (number average molecular weight 2000, 1,2-bond 65%) was epoxidized with peracetic acid to produce epoxidized polybutadiene ($E_2$) having an oxirane oxygen content of 6.4%.

A 2-liter autoclave was charged with 1,000 g of the epoxidized polybutadiene ($E_2$) and 333 g of ethyl Cellosolve, and then 62.1 g of dimethylamine was added. They were reacted at 150° C. for 5 hours. The unreacted amine was evaporated, and a mixture of 79.3 g of acrylic acid, 7.5 g of hydroquinone and 26.5 g of ethyl Cellosolve was added, and they were further reacted at 150° C. for 45 minutes to produce a resin solution ($A_2$) as the component (A) of the invention. The resin solution had an amine value of 88.7 mmoles/100 g, an acid value of 10.6 mmoles/100 g, and a solids concentration of 75.0% by weight.

PRODUCTION EXAMPLE 3

A 2-liter separable flask fitted with a reflux condenser was charged with 1,000 g of Nisseki Polybutadiene B-2000 (number average molecular weight 2000, 1,2-bond 65%), 168 g of maleic anhydride, 10 g of xylene and 2 g of Antigen 3C (a trade name for a product of Sumitomo Chemical Co., Ltd.), and they were reacted in a stream of nitrogen at 190° C. for 5 hours. The unreacted maleic anhydride and xylene were evaporated under reduced pressure to synthesize maleinized polybutadiene ($M_1$) having an acid value of 143 mmoles/100 g.

One thousand grams of the maleinized polybutadiene ($M_1$) and 200 g of ethyl Cellosolve was fed into a 2-liter separable flask fitted with a reflux condenser and heated at 80° C. with stirring. Then, 146 g of N,N-dimethylaminopropylamine was added dropwise. Immediately after the addition, the temperature was raised to 150° C. and the reaction was continued at this temperature for 5 hours. The water formed, ethyl Cellosolve and the unreacted amine were evaporated under reduced pressure to synthesize imidized polybutadiene having a tertiary amino group. The resulting imidized polybutadiene had an amine value of 132 mmoles/100 g. The imidized polybutadiene was dissolved in ethyl Cellosolve to a solids content of 75% by weight to prepare a resin solution ($A_3$) of the component (A).

PRODUCTION OF COMPONENT (C)
[PRODUCTION EXAMPLES 4 and 5]

PRODUCTION EXAMPLE 4

A 2-liter separable flask fitted with a reflux condenser was charged with 1,000 g of Nisseki Polybutadiene B-700 (number average molecular weight 700, 1,2-bond 52%), 117.3 g of maleic anhydride, 1 g of Antigen 3C and 10 g of xylene, and they were reacted in a stream of nitrogen at 195° C. for 5 hours. Then, the unreacted maleic anhydride and xylene were evaporated under reduced pressure to synthesize maleinized polybutadiene ($M_2$) having an acid value of 107 mmoles/100 g.

Five hundred grams of the maleinized polybutadiene ($M_2$) and 148 g of ethyl Cellosolve were reacted at 120° C. for 2 hours to ring-open the succinic anhydride groups. The product was then cooled to room temperature, and 100 g of a 22.5% aqueous solution of sodium hydroxide was gradually added to neutralize the product. Then, deionized water was added to a solids concentration of 25% by weight to prepare an aqueous solution of the maleinized polybutadiene.

Then, 74.5 g of manganese sulfate ($MnSO_4 \cdot H_2O_{4.5}$) was dissolved in 600 g of water, and then 600 g of isopropyl alcohol and 1,000 g of benzene were added. With stirring, 2,192 g of the above aqueous solution of the maleinized polybutadiene was added gradually at room temperature. After the addition, the mixture was heated at 60° C. for 30 minutes, and allowed to stand for 1 hour. It separated into two layers. The lower layer was removed, and 1,000 g of deionized water was added. The mixture was heated at 60° C. for 30 minutes, and then allowed to stand for 1 hour. The lower layer was removed.

The upper layer was taken out, and benzene, etc. were evaporated under reduced pressure to produce a manganese salt of maleinized polybutadiene by a double decomposition method.

The resulting manganese salt of maleinized polybutadiene was dissolved in ethyl Cellosolve to a solids content of 75% by weight to prepare a solution ($C_1$) of an oil-soluble manganese salt as component (C) of the invention. The manganese content of ($C_1$) was 2% by weight.

PRODUCTION EXAMPLE 5

A 3-liter separable flask fitted with a bottom valve was charged with 332.4 g of 4-methyltetrahydrophthalic anhydride and 286.4 g of 2-ethylhexanol, and they were reacted at 120° C. for 2 hours to half-esterify the anhydride group. The product was then cooled to room temperature, and 334 g of a 25% by weight aqueous solution of sodium hydroxide was gradually added to neutralize the product. Then, 1,000 g of benzene and 1,230 g of an aqueous solution containing 238 g of manganese chloride ($MnCl_2 \cdot 4H_2O$) was added, and the mixture was vigorously stirred at room temperature for 1 hour. Then, the mixture was left to stand for 2 hours, whereupon it separated into two layers. The lower layer was removed, and 1,000 g of deionized water was added to the upper layer, and the mixture was vigorously stirred at room temperature for 1 hour. The mixture was left to stand for 2 hours, and the lower layer was removed.

The upper layer was taken out, and benzene, etc. were evaporated under reduced pressure to produce an oil-soluble manganese salt ($C_2$) as component (C) of the invention represented by the following formula

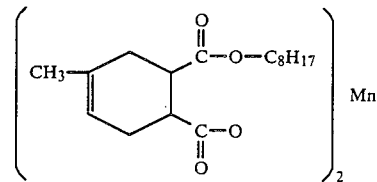

was produced.

PRODUCTION OF COMPOUNDS (a) AS COMPONENT (B) (PRODUCTION EXAMPLES 6 to 12)

PRODUCTION EXAMPLE 6

One thousand grams of a bisphenol-type epoxy resin (Epikote 1001, a trade name for a product of Yuka-Shell Epoxy Co., Ltd.) having an epoxy equivalent of 500 was used as a compound of the following formula

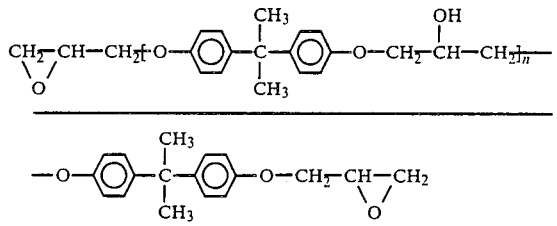

obtained by the reaction of bipshenol A with epichlorohydrin in the presence of an alkali catalyst, and dissolved in 283 g of ethyl Cellosolve. Then, 58 g of fumaric acid, 72 g of acrylic acid, 90.5 g of hydroquinone and 5 g of N,N-dimethylaminoethanol were added. The mixture was heated to 100° C., and reacted for 7 hours to synthesize an ethyl Celllosolve solution ($B_1$) of the epoxy resin/unsaturated carboxylic acid adduct as component (B) of this invention. This solution had an acid value of 10 mmoles/100 g resin and an epoxy value of 0.5 mmole/100 g.

PRODUCTION EXAMPLE 7

One thousand grams of bisphenol-type epoxy resin (Epikote 1001) having an epoxy equivalent of 500 was dissolved in 280 g of ethyl Cellosolve, and then 87 g of maleic acid, 36 g of acrylic acid, 0.2 g of hydroquinone and 5 g of N,N-dimethylaminoethanol were added. Under the same reaction conditions as in Production Example 6, an ethyl Cellosolve solution ($B_2$) of the epoxy resin-unsaturated carboxylic acid adduct was prepared. This solution had an acid value of 8 mmoles/100 g of resin and an epoxy value of 0.3 mmole/100 g.

PRODUCTION EXAMPLE 8

One thousand grams of a bisphenol-type epoxy resin having an epoxy equivalent of 500 (Epikote 1001) was dissolved in 338 g of butyl Cellosolve, and then 29 g of fumaric acid, 321 g of a half-ester of maleic anhydride/2-hydroxyethyl acrylate, 0.5 g of hydroquinone and 5 g of N,N-dimethylaminoethanol were added. The mixture was heated to 110° C., and reacted for 5 hours to synthesize a butyl Cellosolve solution ($B_3$) of the epoxy resin-unsaturated carboxyic acid adduct as component (B) of this invention.

This solution had an acid value of 5 mmoles/100 g and an epoxy value of 0.2 mmole/100 g.

PRODUCTION EXAMPLE 9

One thousand grams of a bisphenol-type epoxy resin (Epikote 1004, a trade name for a product of Yuka-Shell Epoxy Co., Ltd.) having an epoxy equivalent of 950 was dissolved in 356 g of ethyl Cellosolve, and then 30 g of fumaric acid, 38 g of acrylic acid, 0.3 g of hydroquinone and 5 g of N,N-dimethylbenzylamine were added. The mixture was heated to 115° C., and reacted for 7 hours to synthesize an ethyl Cellosolve solution ($B_4$) of the epoxy resin-unsaturated carboxylic acid adduct as component (B) of the invention.

This solution had an acid value of 10 mmoles/100 g and an epoxy value of 1.0 mmole/100 g.

PRODUCTION EXAMPLE 10

One thousand grams of a bisphenol-type epoxy resin having an epoxy equivalent of 950 (Epikote 1004) was dissolved in 381 g of butyl Cellosolve, and then 28.8 g of acrylic acid, 103.2 g of a 1:1 mole adduct of glycidyl methacrylate and fumaric acid, 11.6 g of fumaric acid, 0.5 g of hydroquinone and 5 g of N,N-dimethylaminoethanol were added. The mixture was heated to 100° C. and reacted for 9 hours to synthesize a butyl Cellosolve solution ($B_5$) of the epoxy resin-unsaturated carboxylic acid as component (B).

PRODUCTION EXAMPLE 11

One thousand grams of a bisphenol-type epoxy resin (Epikote 1001) having an epoxy equivalent of 485 was used as a compound represented by the following formula

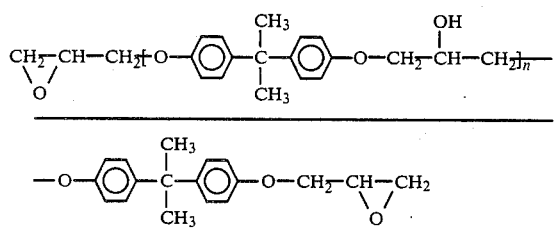

obtained by reacting bisphenol A with epichlorohydrin in the presence of an alkali catalyst, and dissolved in 272 g of ethyl Cellosolve. Then, 148 g of acrylic acid, 10 g of hydroquinone and 5 g of N,N-dimethylaminoethanol were added. The mixture was heated at 100° C. for 5 hours to synthesize an ethyl Cellosolve solution ($B_6$) of the epoxy resin-arcylic acid adduct as a component to be used in a comparison.

PRODUCTION EXAMPLE 12

One thousand grams of a bisphenol-type epoxy resin (Epikote 1004) having an epoxy equivalent of 955 was used as a compound of the following formula

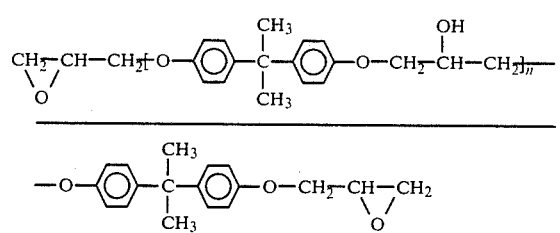

obtained by reacting bisphenol A with epichlorohydrin in the presence of an alkali catalyst, and dissolved in 412 g of ethyl Cellosolve acetate. Then, 91 g of acrylic acid, 12 g of hydroquinone and 6 g of N,N-dimethylaminoethanol were added. The mixture was heated to 100° C. and reacted for 5 hours to synthesize an ethyl Cellosolve solution ($B_7$) of the epoxy resin-acrylic acid adduct as a component to be used in a comparison.

EXAMPLES IN WHICH THE COMPOUND (a) WAS USED AS COMPONENT (B)

EXAMPLE 1

Four hundred grams of the solution ($A_1$) produced in Production Example 1, 225 g of the solution ($B_1$) produced in Production Example 6 and 15 g of butyl Cellosolve were mixed until a uniform mixture formed. Acetic acid (4.5 g) was added, and the mixture was fully stirred to neutralize the resin. Deionized water was gradually added to prepare an aqueous solution having a solids concentration of 20% by weight.

Two thousand grams of this 20% by weight aqueous solution, 4 g of carbon black, 20 g of basic lead silicate and 2,000 g of glass beads were put in a 50-liter stainless steel beaker, and vigorously stirred for 2 hours by a high-speed rotating mixer. The glass beads were removed by filtration, and deionized water containing 2.5 g of manganese acetate was added to prepare an electrodeposition coating solution so that its solids concentration became 15% by weight.

The electrodeposition coating solution was electrodeposited on a zinc phosphate treated plate (Bt 3004, 0.8×7.0×150 mm; a product of Nippon Test Panel Co., Ltd.) as the cathode using a carbon electrode as the anode. The results of various tests are shown in Table 1.

EXAMPLE 2

A cathode-depositing electrodeposition coating solution was prepared under the same conditions as in Example 1 except that the solution ($B_2$) produced in Production Example 7 was used instead of the solution ($B_1$) produced in Production Example 6. Tests under the same conditions as in Example 1 were performed, and the results are summarized in Table 1.

EXAMPLE 3

A cathode-depositing elecrodeposition coating solution was prepared under the same conditions as in Example 1 except that the solution ($B_3$) produced in Production Example 8 was used instead of the solution ($B_1$) produced in Production Example 6. Tests under the same conditions as in Example 1 were performed, and the results are summarized in Table 1.

COMPARATIVE EXAMPLE 1

A cathode-depositing electrodeposition coating solution was prepared under the same conditions as in Example 1 except that the solution ($B_6$) produced in Production Example 11 was used instead of the solution (B₁) produced in Production Example 1. Tests under the same conditions as in Example 1 were carried out, and the results are summarized in Table 1.

(B4) produced in Production Example 9. Tests under the same conditions as in Example 4 were carried out, and the results are summarized in Table 2.

TABLE 1

| Example (Ex.) or Comparative Example (CEx.) | | Ex. 1 | | Ex. 2 | | Ex. 3 | | CEx. 1 | |
|---|---|---|---|---|---|---|---|---|---|
| Properties of the coating solution | pH | 6.2 | | 6.2 | | 6.2 | | 6.2 | |
| | Electrical conductivity (m-ohms/cm) | 1.5 | | 1.6 | | 1.6 | | 1.6 | |
| Electro-deposition properties | Film breakdown voltage (V) | 330 | | 340 | | 310 | | 360 | |
| | Film resistance (K ohms-cm$^2$) (*1) | 510 | | 490 | | 480 | | 790 | |
| | Coulomb efficiency (mg/C) | 18 | | 20 | | 21 | | 23 | |
| Coating conditions | Voltage (V) | 120 | | 150 | | 160 | | 200 | |
| | Time (min.) | 3 | | 3 | | 3 | | 3 | |
| Baking temperature (°C.; baking time 30 min.) | | 160 | 180 | 160 | 180 | 160 | 180 | 160 | 180 |
| Thickness of the coated film (microns) | | 20 | 19 | 19 | 20 | 20 | 20 | 20 | 20 |
| Physical tests | Pencil hardness | 2H | 3H | H | 2H | 2H | 3H | 2B | H |
| | Erichsen (mm) | 6.5 | 5.5 | >7 | 6.0 | 6.5 | 5.0 | >7 | >7 |
| | Impact strength Surface (*2) | >50 | >50 | >50 | >50 | >50 | >50 | >50 | >50 |
| | Impact strength Back (*2) | 40 | 20 | 50 | 30 | 50 | 30 | >50 | 30 |
| Chemical tests | Solvent resistance (*3) | | | | | | | X | |
| | Corrosion resistance 500 hours (*4) | | | | | | | X | |

(*1): Calculated from the following equation $$\frac{\text{Coating voltage (V)}}{\text{Residual current}} \times \text{Surface area (cm}^2\text{) of the plate coated}$$

(*2): The maximum height (cm) by a falling weight test (500 g, ½B) which did not cause breakage of the coated film.
(*3): A rubbing test (50 cycles per minute) using methyl isobutyl ketone was carried out, and the result was evaluated on the following standard.
  ○: Not changed.
  Δ: The rubbed portion became hazy.
  X: The substrate was exposed.
(*4): The maximum rust width from a cut portion formed on the coated film was determined, and evaluated on the following standard (5% NaCl aqueous solution spray test)
  ○: less than 1 mm
  ○: 1-2 mm
  Δ: 2-3 mm
  X: more than 3 mm

EXAMPLE 4

Four hundred grams of the solution (A₂) produced in Production Example 2, 240 g of the solution (B₄) produced in Production Example 9 and 50 g of butyl Cellosolve were mixed until a uniform mixture formed. Then, 5.2 g of acetic acid was added, and the mixture was fully stirred to neutralize the resin. Then, deionized water containing 3.4 of manganese acetate was added gradually to prepare an aqueous solution having solids concentration of 25% by weight. One thousand gams of the 25% by weight aqueous solution, 2.5 g of carbon black, 25 g of basic lead silicate and 1,000 g of glass beads were put in a 3-liter stainless steel beaker, and vigorously stirred for 2 hours by a high-speed rotating mixer. The glass beads were removed by filtration, and deionized water was added until the solids concentration became 18% by weight to prepare an electrodeposition coating solution.

The electrodeposition coating solution was electrodeposited on a zinc phosphate treated plate (Bt 3004, 0.8×70×150 mm, a product of Nippon Test Panel Co., Ltd.) as the cathode using a carbon electrode as the anode. The tests shown in Table 2 were carried out, and the results are summarized in Table 2.

COMPARATIVE EXAMPLE 2

A cathode-depositing electrodeposition coating solution was prepared under the same conditions as in Example 4 except that the solution (B₇) produced in Production Example 12 was used instead of the solution

TABLE 2

| Example (Ex.) or Comparative Example (CEx.) | | Ex. 4 | | CEx. 2 | |
|---|---|---|---|---|---|
| Properties of the coating solution | pH | 6.4 | | 6.4 | |
| | Electrical conductivity (m-ohms/cm) | 1.5 | | 1.6 | |
| Electro-deposition properties | Film breakdown voltage (V) | 370 | | 380 | |
| | Film resistance (K ohms-cm$^2$) (*1) | 960 | | 810 | |
| | Coulomb efficiency (mg/C) | 21 | | 19 | |
| Coating conditions | Voltage (V) | 230 | | 210 | |
| | Time (min.) | 3 | | 3 | |
| Baking temperature (°C.; baking time 30 min.) | | 165 | 185 | 165 | 185 |
| Thickness of the coated film (microns) | | 20 | 20 | 19 | 20 |
| Physical tests | Pencil hardness | H | 3H | B | H |
| | Erichsen (mm) | >7 | 6.0 | >7 | >7 |
| | Impact strength Surface (*2) | >50 | >50 | >50 | >50 |
| | Impact strength Back (*2) | 40 | 40 | >50 | >50 |
| Chemical tests | Solvent resistance (*3) | | | X | |
| | Corrosion resistance 500 hours (*4) | | | X | |

(*1), (*2), (*3) and (*4): Same as the footnote to Table 1.

EXAMPLE 5

Four hundred grams of the solution (A₃) produced in Production Example 3, 160 g of the solution (B₅) produced in Production Example 10, 30 g of butyl Cellosolve and 84 g of the solution (C₁) produced in Production Example 4 were mixed until a uniform mixture formed. Acetic acid (8.5 g) was added, and the mixture was fully stirred to neutralize the resin. Deionized water was gradually added to prepare an aqueous solution having a solids concentration of 30% by weight.

One thousand grams of this 30% by weight aquoeus solution, 3 g of carbon black, 20 g of basic lead silicate and 1,000 g of glass beads were put in a 3-liter stainless steel beaker, and vigorously stirred for 2 hours by a high-speed rotating mixer. The glass beads were removed by filtration, and deionized water was added to a solids concentration of 16% to prepare an electrodeposition coating solution.

The electrodepositing coating solution was electrodeposited on a zinc phosphate treated plate (Bt 3004, 0.8×70×150 mm; a product of Nippon Test Panel Co., Ltd.) as the cathode using a carbon electrode as the anode. The tests shown in Table 3 were carried out, and the results are shown in Table 3.

COMPARATIVE EXAMPLE 3

A cathode-depositing electrodeposition coating solution was prepared under the same conditions as in Example 5 except that the solution (B₇) produced in Production Example 12 was used instead of the solution (B₅) produced in Production Example 10. Tests under the same conditions as in Example 5 were carreid out, and the results are summarized in Table 3.

TABLE 3

| Example (Ex.) or Comparative Example (CEx.) | | Ex. 5 | | CEx. 3 | |
| --- | --- | --- | --- | --- | --- |
| Properties of the coating solution | pH | 6.3 | | 6.3 | |
| | Electrical conductivity (m-ohms/cm) | 1.6 | | 1.6 | |
| Electrodeposition properties | Film breakdown voltage (V) | 350 | | 320 | |
| | Film resistance (K ohms·cm²) (*1) | 590 | | 540 | |
| | Coulomb efficiency (mg/C) | 24 | | 22 | |
| Coating conditions | Voltage (V) | 275 | | 260 | |
| | Time (min.) | 3 | | 3 | |
| | Baking temperature (°C.; baking time 30 min.) | 140 | 160 | 140 | 160 |
| | Thickness of the coated film (microns) | 20 | 20 | 20 | 20 |
| Physical tests | Pencil hardness | 2H | 3H | <6B | H |
| | Erichsen (mm) | >7 | 6.0 | (*5) | >7 |
| | Impact strength Surface (*2) | >50 | >50 | (*5) | >50 |
| | Impact strength Back | >50 | >50 | (*5) | >50 |
| Chemical tests | Solvent resistance (*3) | | | X | Δ |
| | Corrosion resistance 500 hours (*4) | | | X | Δ |

(*1), (*2), (*3) and (*4): Same as the footnote to Table 1.
(*5): Since the coated film had marked tackiness, the test could not be conducted.

PRODUCTION OF COMPOUNDS (b) AS COMPONENT (B) (PRODUCTION EXAMPLES 13-19)

PRODUCTION EXAMPLE 13

One thousand grams of a bisphenol-type epoxy resin (Epikote 1001) having an epoxy equivalent of 500 was used as a compound of the following formula

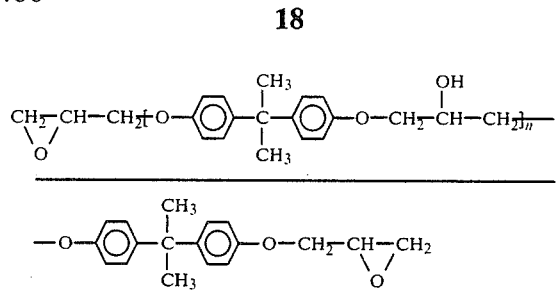

obtained by reacting bisphenol A with epichlorohydrin in the presence of an alkali catalyst, and dissolved in 338 g of ethyl Cellosolve, and then 281 g of dehydrated castor oil fatty acid (a product of Ito Seiyu Co., Ltd.), 72 g of acrylic acid, 0.5 g of hydroquinone and 5 g of N,N-dimethylaminoethanol were added. The mixture was heated to 100° C. and reacted for 7 hours to synthesize an ethyl Cellosolve solution (B₈) of the epoxy resin-unsaturated carboxylic acid adduct as component (B). This solution had an acid value of 5 mmole/100 g and an epoxy value of 0.2 mmole/100 g.

PRODUCTION EXAMPLE 14

One thousand grams of a bisphenol-type epoxy resin (Epikote 1004) having an epoxy equivalent of 950 was dissolved in 395 g of ethyl Cellosolve, and then 147 g of eleostearic acid, 38 g of acrylic acid, 0.3 g of hydroquinone, and 5 g of N,N-dimethylbenzylamine were added. The mixture was heated to 115° C. and reacted for 7 hours to synthesize an ethyl Cellosolve solution (B₉) of the epoxy resin-unsaturated carboxylic acid adduct as component (B) of this invention. This solution had an acid value of 4 mmoles/100 g and an epoxy value of 0.3 mmoles/100 g.

PRODUCTION EXAMPLE 15

One thousand grams of a bisphenol-type epoxy resin (Epikote 1004) having an epoxy equivalent of 950 was dissolved in 385 g of butyl Cellosolve, and then 111.3 g of highly conjugated linoleic acid (Hai-diene, a trade name for a product of Soken Kagaku Kabushiki Kaisha), 47.5 g of acrylic acid, 7.5 g of hydroquinone and 5 g of N,N-diethylaminoethanol were added. The mixture was heated to 110° C., and reacted for 5 hours to synthesize a butyl Cellosolve solution (B₁₀) of the epoxy resin-unsaturated carboxylic acid adduct as component (B) of the invention. The solution had an acid value of 5 mmoles/100 g and an epoxy value of 0.2 mmole/100 g.

PRODUCTION EXAMPLE 16

One thousand grams of a bisphenol-type epoxy resin (Epikote 1001) having an epoxy equivalent of 500 was dissolved in 312 g of ethyl Cellosolve, and then 141 g of dehydrated castor oil fatty acid (a product of Ito Seiyu K. K.), 108 g of acrylic acid, 3.2 g of hydroquinone and 5 g of N,N-dimethylaminoethanol were added. The mixture was reacted under the same conditions as in Example 4 to synthesize an ethyl Cellosolve solution (B₁₁) of the epoxy resin-unsaturated carboxylic acid adduct as component (B) of the invention. This solution had an acid value of 8 mmoles/100 g and an epoxy value of 0.3 mmole/100 g.

PRODUCTION EXAMPLE 17

One thousand grams of a bisphenol-type epoxy resin (Epikote 1001) having an epoxy equivalent of 500 was dissolved in 286 g of ethyl Cellosolve, and then 144 g of acrylic acid, 10 g of hydroquinone and 5 g of N,N-dimethylaminoethanol were added. The mixture was heated to 100° C. and reacted for 5 hours to synthesize an ethyl Cellosolve solution (B$_{12}$) of the epoxy resin-acrylic acid adduct to be used as a component in a comparison.

PRODUCTION EXAMPLE 18

One thousand grams of a bisphenol-type epoxy resin (Epikote 1004) having an epoxy equivalent of 950 was dissolved in 358 g of ethyl Cellosolve, and then 76 g of acrylic acid, 10 g of hydroquinone and 5 g of N,N-dimethylaminoethanol were added. The mixture was heated to 100° C. and reacted for 5 hours to synthesize an ethyl Cellosolve solution (B$_{13}$) of the epoxy resin-acrylic acid adduct to be used as a component in a comparison.

PRODUCTION EXAMPLE 19

One thousand grams of a bisphenol-type epoxy resin (Epikote 1004) having an epoxy equivalent of 955 was used as a compound of the following formula

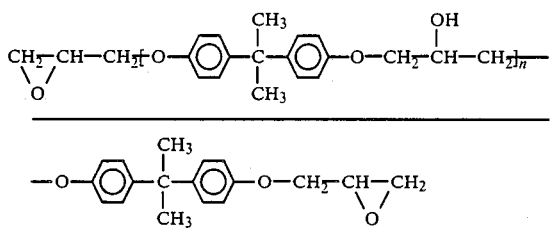

obtained by reacting bipshenol A with epichlorohydrin in the presence of an alkali catalyst, and dissolved in 395 g of ethyl Cellosolve acetate. Then, 37 g of acrylic acid, 144 g of soybean oil fatty acid, 12 g of hydroquinone and 6 g of N,N-dimethylaminoethanol. The mixture was heated to 100° C., and reacted for 5 hours to synthesize an ethyl Cellosolve acetate solution (B$_{14}$) of the epoxy resin-acrylic acid adduct as a component to be used in a comparison.

EXAMPLES IN WHICH THE COMPOUNDS (b) WERE USED AS THE COMPONENT (B) (EXAMPLES 6–9 and COMPARATIVE EXAMPLES 4–7)

EXAMPLE 6

Four hundred grams of the solution (A$_1$) produced in Production Example 1, 112.5 g of the solution (B$_8$) produced in Production Example 13 and 5 g of butyl Cellosolve were mixed until a uniform mixture formed. Acetic acid (6.5 g) was added, and the mixture was fully stirred to neutralize the resin. Then, deionized water was gradually added to prepare an aqueous solution having a solids concentration of 20% by weight.

Two thousand grams of the 20% by weight aqueous solution, 4 g of carbon black, 20 g of basic lead silicate and 2,000 g of glass beads were put in a 5-liter stainless steel beaker, and vigorously stirred for 2 hours by a high-speed rotating mixer. The glass beads were removed by filtration. Deionized water containing 1.2 g of manganese acetate was added to a solids concentation of 15% by weight to prepare an electrodeposition coating solution.

The electrodeposition coating solution was electrodeposited on a zinc phosphate treated plate (Bt 3004, 0.8×70×150 mm, a product of Nippon Test Panel Co., Ltd.) as the cathode using a carbon electrode as the anode. The tests shown in Table 4 were carried out, and the results are shown in Table 4.

COMPARATIVE EXAMPLE 4

A cathode-depositing electrodeposition coating solution was prepared under the same conditions as in Example 1 except that the solution (B$_{12}$) produced in Production Example 17 was used instead of the solution (B$_8$) produced in Production Example 13. Tests under the same conditions as in Example 6 were carried out, and the results are summarized in Table 4.

TABLE 4

| | Example 6 | Comparative Example 4 |
|---|---|---|
| Baking temperature (°C.) (baking time 20 minutes) | 160 | 160 |
| Thickness of the coated film (microns) | 20 | 20 |
| Pencil hardness | 2H | 2H |
| Solvent resistance (*3) | | Δ |
| Corrosion resistance 500 hours (*4) | | Δ |

(*3) and (*4): Same as the footnote to Table 1.

EXAMPLE 7

Four hundred grams of the solution (A$_2$) produced in Production Example 2 and 240 g of the solution (B$_9$) produced in Production Example 14 were mixed until a uniform mixture formed. Acetic acid (8.0 g) was added, and the mixture was fully stirred to neutralize the resin. Deionized water containing 0.8 g of manganese acetate was gradually added to prepare an aqueous solution having a solids concentration of 25% by weight.

One thousand grams of the 25% by weight aqueous solution, 25 g of carbon black, 25 g of basic lead silicate and 1,000 g of glass beads were put in a 3-liter stainless steel beaker and vigorously stirred for 2 hours by a high-speed rotating mixer. The glass beads were removed by filtration, and deionized water was added to a solids concentration of 18% to prepare an electrodeposition coating solution.

The resulting electrodeposition coating solution was electrodeposited on a zinc phosphate treated plate (Bt 3004, 0.8×70×150 mm, a product of Nippon Test Panel Co., Ltd.) as the cathode using a carbon electrode as the anode. The tests shown in Table 5 were carried out, and the results are shown in Table 5.

EXAMPLE 8

A cathode-depositing electrodeposition coating solution was prepared under the same conditions as in Example 7 except that the solution (B$_{10}$) produced in Production Example 15 was used instead of the solution (B$_9$) produced in Production Example 14. Tests under the same conditions as in Example 7 were carried out, and the results are shown in Table 5.

COMPARATIVE EXAMPLE 5

A cathode-depositing electrodeposition coating solution was prepared under the same conditions as in Example 7 except that the solution (B$_{13}$) produced in Production Example 18 was used instead of the solution (B$_9$) produced in Production Example 14. Tests under the same conditions as in Example 7 were carried out, and the results are shown in Table 5.

COMPARATIVE EXAMPLE 6

A cathode-depositing electrodeposition coating solution was prepared under the same conditions as in Example 7 except that the solution (B$_{14}$) produced in Production Example 19 was used instead of the solution (B$_9$) produced in Production Example 14. Tests under the same conditions as in Example 7 were carried out, and the results are shown in Table 5.

TABLE 5

|  | Example 7 | Example 8 | Comparative Example 5 | Comparative Example 6 |
| --- | --- | --- | --- | --- |
| Baking temperature (°C., baking time 20 minutes) | 165 | 165 | 165 | 165 |
| Thickness of the coated film (microns) | 20 | 20 | 20 | 20 |
| Pencil hardness | H | H | HB | HB |
| Solvent resistance |  | (*3) | Δ | Δ |
| Corrosion resistance 500 hours (*4) |  |  | Δ | Δ |

(*3) and (*4): Same as the footnote to Table 1.

EXAMPLE 9

Four hundred grams of the solution (A$_3$) produced in Production Example 3, 150 g of the solution (B$_{11}$) produced in Production Example 16 and 42 g of the solution (C$_1$) produced in Production Example 4 were mixed until a uniform mixture formed. Acetic acid (8.5 g) was added, and the mixture was fully stirred to neutralize the resin. Then, deionized water was gradually added to prepare an aqueous solution having a solids concentration of 30% by weight.

One thousand grams of the 30% by weight aqueous solution, 3 g of carbon black, 20 g of basic lead silicate and 1,000 g of glass beads were put in a 3-liter stainless steel beaker, and vigorously stirred for 2 hours by a high-speed rotating mixer. The glass beads were removed by filtration, and deionized water was added to a solids concentration of 16% to prepare an electrodeposition coating solution.

The resulting elecrodeposition coating solution was electrodeposited on a zinc phosphate treated plate (Bt 3004, 0.8×70×150 mm; a product of Nippon Test Panel Co., Ltd.) as the cathode using a carbon electrode as the anode. The tests shown in Table 6 were carried out, and the results are shown in Table 6.

COMPARATIVE EXAMPLE 7

A cathode-depositing electrodeposition coating solution was prepared under the same conditions as in Example 9 except that the solution (B$_{12}$) produced in Production Example 17 was used instead of the solution (B$_{11}$) produced in Production Example 16. Tests under the same conditions as in Example 9 were carried out, and the results are shown in Table 6.

TABLE 6

|  | Example 9 | Comparative Example 7 |
| --- | --- | --- |
| Baking temperature (°C.; baking time 30 minutes) | 160 | 160 |
| Thickness of the coated film (microns) | 20 | 20 |
| Pencil hardness | H | B |
| Solvent resistance (*3) |  | Δ |
| Corrosion resistance 500 hours (*4) |  | Δ |

(*3) and (*4): Same as the footnote to Table 1.

PRODUCTION OF COMPOUNDS (c) AS COMPONENT (B) [PRODUCTION EXAMPLES 20 to 26]

PRODUCTION EXAMPLE 20

One thousand grams of a bisphenol-type epoxy resin (Epikote 1001) having an epoxy equivalent 485 was used as a compound of the formula

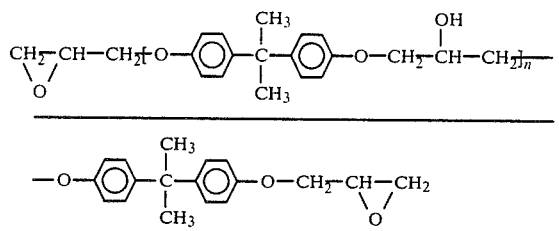

obtained by the reaction of bisphenol A with epichlorohydrin in the presence of an alkali catalyst, and dissolved in 368 g of ethyl Cellosolve acetate. Then, 148 g of acrylic acid, 10 g of hydroquinone and 5 g of N,N-dimethylaminoethanol were added. The mixture was heated to 100° C., and reacted for 5 hours to sythesize an ethyl Cellosolve acetate solution (B$_{15}$) of the epoxy resin-acrylic acid adduct as a component to be used in a comparison.

PRODUCTION EXAMPLE 21

One thousand grams of a bisphenol-type epoxy resin (Epikote 1004) having an epoxy equivalent of 955 was used as a compound of the following formula

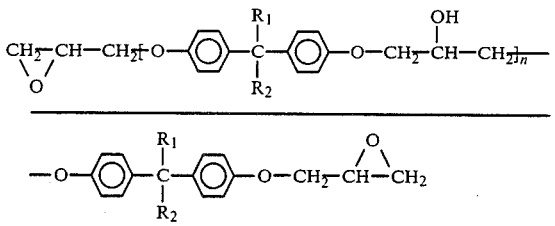

obtained by the reaction of bisphenol A with epichlorohydrin in the presence of an alkali catalyst, and dissolved in 412 g of ethyl Cellosolve acetate. Then 91 g of acrylic acid, 12 g of hydroquinone and 6 g of N,N-dimethylaminoethanol were added. The mixture was heated to 100° C. and reacted for 5 hours to synthesize an ethyl Cellosolve acetate solution (B$_{16}$) of the epoxy resin-acrylic acid adduct as a component to be used in a comparison.

PRODUCTION EXAMPLE 22

The ethyl Cellosolve acetate solution (B$_{15}$) of the epoxy resin-acrylic acid adduct synthesized in Production Example 20 (1,531 g) was put in a 3-liter separable flask, and 305 g of phthalic anhydride and 102 g of ethyl Cellosolve acetate were added. They were reacted at 110° C. for 3 hours. Analysis of the infrared absorption spectrum of the reaction product showed that the absorptions at 1850 cm$^{-1}$ and 1760-1780 cm$^{-1}$ ascribable to the acid anhydride vanished.

Six hundred grams of the reaction product was put in a 1-liter separable flask, and 90.6 g of glycidyl methacrylate, 3 g of hydroquinone, 1.5 g of dimethylaminoethanol and 25.7 g of ethyl Cellosolve acetate were added. They were reacted at 110° C. for 4 hours to synthesize an ethyl Cellosolve acetate solution (B$_{17}$) of the modified epoxy resin as component (B) of the invention.

This solution had an acid value of 10.5 mmoles/100 g and a solids concentration of 75.0% by weight.

PRODUCTION EXAMPLE 23

The ethyl Cellosolve acetate solution ($B_{15}$) of the epoxy resin-acrylic acid adduct synthesized in Production Example 20 (1,531 g) was put in a 3-liter separable flask, and 305 g of phthalic anhydride and 102 g of ethyl Cellosolve acetate were added. They were reacted at 110° C. for 3 hours. Analysis of the infrared absorpiton spectrum of the reaction product showed that the absorptions at 1850 cm$^{-1}$ and 1760–1780 cm$^{-1}$ ascribable to the acid anhydride vanished.

Six hundred grams of the reaction product was put in a 1-liter separable flask, and 72.8 g of allyl glycidyl ether, 3 g of hydroquinone, 1.5 g of dimethylaminoethanol and 19.8 g of ethyl Cellosolve acetate were added. They were reacted at 110° C. for 4 hours to synthesize an ethyl Cellosolve acetate solution ($B_{18}$) of the modified epoxy resin as component (B) of the invention.

This solution had an acid value of 11.5 mmoles/100 g and a solids concentration of 75.0% by weight.

PRODUCTION EXAMPLE 24

The ethyl Cellosolve acetate solution ($B_{15}$) of the epoxy resin-acrylic acid adduct synthesized in Production Example 20 (1,531 g) was put in a 3-liter separable flask, and 153 g of phthalic anhydride, 198 g of trimellitic anhydride and 117 g of ethyl Cellosolve acetate were added. They were reacted at 110° C. for 3 hours.

Six hundred grams of the reaction product was put in a 1-liter separable flask, and 67.0 g of butylene oxide, 3 g of hydroquinone, 1.5 g of dimethylaminoethanol and 17.8 g of ethyl Cellosolve acetate were added. They were reacted at 110° C. for 4 hours to synthesize an ethyl Cellosolve acetate solution ($B_{19}$) of the modified epoxy resin as component (B) of the invention.

This solution had an acid value of 14.0 mmoles/100 g and a solids concentration of 75.0% by weight.

PRODUCTION EXAMPLE 25

The ethyl Cellosolve acetate solution ($B_{15}$) of the epoxy resin-acrylic acid adduct synthesized in Production Example 20 (1,531 g) was put in a 3-liter separable flask, and 153 g of phthalic anhydride, 198 g of trimellitic anhydride and 117 g of ethyl Cellosolve acetate were added. They were reacted at 110° C. for 3 hours.

Six hundred grams of the reaction product was put in a 1-liter separable flask, and 105.9 g of allyl glycidyl ether, 3 g of hydroquinone, 1.5 g of dimethylaminoethanol and 30.8 g of ethyl Cellosolve acetate were added, and they were reacted at 110° C. for 4 hours to synthesize an ethyl Cellosolve acetate solution ($B_{20}$) of the modified epoxy resin as component (B) of the invention.

This solution had an acid value of 19.3 mmoles/100 g, and a solids concentration of 75.0% by weight.

PRODUCTION EXAMPLE 26

The ethyl Cellosolve acetate solution ($B_{16}$) of the epoxy resin-acrylic acid adduct synthesized in Production Example 21 (1,709 g) was put in a 3-liter separable flask, and 237.5 g of trimellitic anhydride and 79.2 g of ethyl Cellosolve acetate were added. They were reacted at 110° C. until the absorptions ascribable to the acid anhydride in the infrared absorption spectrum of the reaction product vanished.

Six hundred grams of the reaction product were put in a 1-liter separable flask, and 104.1 g of glycidyl methacrylate, 3 g of hydroquinone, 1.5 g of dimethylaminoethanol and 30.2 g of ethyl Cellosolve acetate were added. They were reacted at 110° C. for 4 hours to synthesize an ethyl Cellosolve acetate solution ($B_{21}$) of the modified epoxy resin as component (B) of the invention.

This solution had an acid value of 9.5 mmoles/100 g and a solids concentration of 75.0% by weight.

EXAMPLES IN WHICH COMPOUNDS (c) WERE USED AS COMPONENT (B) [EXAMPLES 10–15 and COMPARATIVE EXAMPLES 8–10]

EXAMPLE 10

Four hundred grams of the solution ($A_2$) produced in Production Example 2, 160 g of the solution ($B_{17}$) produced in Production Example 22 and 14.8 g of the solution ($C_2$) produced in Production Example 5 were mixed until a uniform mixture formed. Then, 5.9 g of acetic acid was added and the mixture was fully stirred to neutralize the resin. Deionized water was gradually added to prepare an aqueous solution having a solids concentration of 20% by weight.

Two thousand grams of the 20% by weight aqueous solution, 4 g of carbon black, 20 g of basic lead silicate and 2,000 g of glass beads were put in a 5-liter stainless steel beaker, and vigorously stirred for 2 hours by a high-speed rotating mixer. The glass beads were removed by filtration, and deionized water was added to a solids concentration of 15% by weight to prepare an electrodeposition coating solution.

The resulting electrodeposition coating solution was electrodeposited on a zinc phosphate treated plate (Bt 3004, 0.8×70×150 mm; a product of Nippon Test Panel Co., Ltd.) as the cathode using a carbon electrode as the anode. The tests shown in Table 7 were carried out, and the results are shown in Table 7.

COMPARATIVE EXAMPLE 8

A cathode-depositing electrodeposition coating solution was prepared under the same conditions as in Example 10 except that the solution ($B_{15}$) produced in Production Example 20 was used instead of the solution ($B_{17}$) produced in Production Example 22. Tests under the same conditions as in Example 10 were carried out, and the results are shown in Table 7.

TABLE 7

| Example (Ex.) or Comparative Example (CEx.) | | Ex. 10 | | CEx. 8 | |
| --- | --- | --- | --- | --- | --- |
| Properties of the coating solution | pH | 6.4 | | 6.4 | |
| | Electrical conductivity (m-ohms/cm) | 1.5 | | 1.5 | |
| Electrodeposition properties | Film breakdown voltage (V) | 380 | | 360 | |
| | Film resistance (K ohms-cm$^2$) (*1) | 800 | | 700 | |
| | Coulomb efficiency (mg/C) | 21 | | 20 | |
| Coating conditions | Voltage (V) | 210 | | 200 | |
| | Time (min.) | 3 | | 3 | |
| Baking temperature (°C.; baking time 30 min.) | | 140 | 160 | 140 | 160 |
| Thickness of the coated film (microns) | | 20 | 19 | 19 | 20 |
| Physical tests | Pencil hardness | H | 2H | <6B | HB |
| | Erichsen (mm) | >7 | 6.5 | (*5) | >7 |
| | Impact strength Surface (*2) | >50 | >50 | (*5) | >50 |
| | Back | >50 | >50 | (*5) | >50 |
| Chemical tests | Solvent resistance (*3) | | | X | △ |
| | Corrosion resistance 500 hours (*4) | | | X | |

(*1), (*2), (*3) and (*4): Same as the footnote to Table 1.
(*5): Same as the footnote to Table 3.

EXAMPLE 11

Four hundred grams of the solution ($A_1$) produced in Production Example 1, 240 g of the solution ($B_{17}$) produced in Production Example 22 and 25 g of butyl Cellosolve were mixed until a uniform mixture formed.

Then, 5.6 g of acetic acid was added and the mixture was fully stirred to neutralize the resin. Deionized water was gradually added to prepare an aqueous solution having a solids concentration of 25% by weight.

One thousand grams of the 25% by weight aqueous solution, 2.5 g of carbon black, 25 g of basic lead silicate and 1,000 g of glass beads were put in a 3-liter stainless steel beaker, and vigorously stirred for 2 hours by a high-speed rotating mixer. The glass beads were removed by filtration, and deionized water containing 1.6 g of manganese acetate was added to a solids concentration of 18% by weight to prepare an electrodeposition coating solution.

The resulting electrodeposition coating solution was electrodeposited on a zinc phosphate treated plate (Bt 3004, 0.8×70×150 mm; a product of Nippon Test Panel Co., Ltd.) as the cathode using a carbon electrode as the anode. The tests shown in Table 8 were carried out, and the results are shown in Table 8.

EXAMPLE 12

A cathode-depositing electrodeposition coating solution was prepared under the same conditions as in Example 11 except that the solution ($B_{18}$) produced in Production Example 23 was used instead of the solution ($B_{17}$) produced in Production Example 22. Tests under the same conditions as in Example 11 were carried out, and the results are shown in Table 8.

EXAMPLE 13

A cathode-depositing electrodeposition coating solution was prepared under the same conditions as in Example 11 except that the solution ($B_{19}$) produced in Production Example 24 was used instead of the solution ($B_{17}$) produced in Production Example 22. Tests under the same conditions as in Example 11 were carried out, and the results are shown in Table 8.

COMPARATIVE EXAMPLE 9

A cathode-depositing electrodeposition coating solution was prepared under the same conditions as in Example 11 except that the solution ($B_{15}$) produced in Production Example 20 was used instead of the solution ($B_{17}$) produced in Production Example 22. Tests under the same conditions as in Example 11 were carried out, and the results are shown in Table 8.

TABLE 8

| Example (Ex.) or Comparative Example (CEx.) | | Ex. 11 | | Ex. 12 | | Ex. 13 | | CEx. 9 | |
|---|---|---|---|---|---|---|---|---|---|
| Properties of the coating solution | pH | 6.3 | | 6.2 | | 6.2 | | 6.2 | |
| | Electrical conductivity (m-ohms/cm) | 1.4 | | 1.4 | | 1.4 | | 1.4 | |
| Electrodeposition properties | Film breakdown voltage (V) | 320 | | 330 | | 300 | | 350 | |
| | Film resistance (K ohms-cm$^2$) (*1) | 650 | | 800 | | — | | 850 | |
| | Coulomb efficiency (mg/C) | 21 | | 19 | | 21 | | 20 | |
| Coating conditions | Voltage (V) | 210 | | 230 | | 200 | | 250 | |
| | Time (min.) | 3 | | 3 | | 3 | | 3 | |
| | Baking temperature (°C.; baking time 20 min.) | 140 | 180 | 160 | 180 | 160 | 180 | 160 | 180 |
| | Thickness of the coated film (microns) | 20 | 20 | 19 | 20 | 19 | 20 | 20 | 20 |
| Physical test | Pencil hardness | H | 3H | H | 2H | H | 2H | B | 2H |
| | Erichsen (mm) | >7 | 6.0 | >7 | >7 | >7 | >7 | >7 | >7 |
| | Impact strength Surface (*2) | >50 | >50 | >50 | >50 | >50 | >50 | >50 | >50 |
| | Impact strength Back (*2) | >50 | >50 | >50 | >50 | >50 | >50 | >50 | >50 |
| Chemical test | Solvent resistance (3*) | | | | | | | X | |
| | Corrosion resistance 500 hours (*4) | | | | | | | X | |

(*1), (*2), (*3) and (*4): Same as the footnote to Table 1.

EXAMPLE 14

Four hundred grams of the solution ($A_3$) produced in Production Example 3, 200 g of the solution ($B_{20}$) produced in Production Example 25, 50 g of butyl Cellosolve and 90 g of the solution ($C_1$) produced in Production Example 4 were mixed until a uniform mixture formed. Then, 9.5 g of acetic acid was added and the mixture was fully stirred to neutralize the resin. Deionized water was gradually added to prepare an aqueous solution having a solids concentration of 30% by weight.

One thousand grams of the 30% by weight aqueous solution, 3 g of carbon black, 20 g of basic lead silicate and 1,000 g of glass beads were put in a 3-liter stainless steel beaker, and vigorously stirred for 2 hours by a high-speed rotating mixer. The glass beads were removed by filtration, and deionized water was added to a solids concentration of 16% by weight to prepare an electrode-position coating solution.

The resulting electrodeposition coating solution was electrodeposited on a zinc phosphate treated plate (Bt 3004, 0.8×70×150 mm; a product of Nippon Test Panel Co., Ltd.) as the cathode using a carbon electrode as the anode. The tests shown in Table 9 were carried out, and the results are shown in Table 9.

EXAMPLE 15

A cathode-depositing electrodeposition coating solution was prepared under the same conditions as in Example 14 except that the solution ($B_{21}$) produced in Production Example 26 was used instead of the solution ($B_{20}$) produced in Production Example 25. Tests under the same conditions as in Example 14 were carried out, and the results are shown in Table 9.

COMPARATIVE EXAMPLE 10

A cathode-depositing electrodeposition coating solution was prepared under the same conditions as in Example 14 except that the solution ($B_{16}$) produced in Production Example 21 was used instead of the solution (B$_{20}$) produced in Production Example 25. Tests under the same conditions as in Example 14 were carried out, and the results are shown in Table 9.

TABLE 9

| Example (Ex.) or Comparative Example (CEx.) | | Ex. 14 | | Ex. 15 | | CEx. 10 | |
|---|---|---|---|---|---|---|---|
| Properties of the coating solution | pH | 6.3 | | 6.3 | | 6.2 | |
| | Electrical conductivity (m-ohms/cm) | 1.7 | | 1.6 | | 2.0 | |
| Electrodeposition properties | Film breakdown voltage (V) | 300 | | 350 | | 330 | |
| | Film resistance (K ohms-cm$^2$) (*1) | — | | 500 | | 400 | |
| | Coulomb efficiency mg/C) | 21 | | 20 | | 21 | |
| Coating conditions | Voltage (V) | 230 | | 260 | | 210 | |
| | Time (min.) | 3 | | 3 | | 3 | |
| Baking temperature (°C.; baking time 30 min.) | | 140 | 160 | 140 | 160 | 140 | 160 |
| Thickness of the coated film (microns) | | 20 | 20 | 20 | 20 | 20 | 20 |
| Physical test | Pencil hardness | 2H | 3H | 2H | 3H | >8B | 2H |
| | Erichsen (mm) | >7 | 6.0 | >7 | 6.0 | (*5) | >7 |
| | Impact strength Surface (*2) | >50 | >50 | >50 | >50 | (*5) | >50 |
| | Back | >50 | >50 | >50 | 50 | (*5) | >50 |
| Chemical test | Solvent resistance (*3) | | | | | X | |
| | Corrosion resistance 500 hours (*4) | | | | | X | |

(*1), (*2), (*3) and (*4): Same as the footnote to Table 1.
(*5): Same as the footnote to Table 3.

What we claim is:

1. A cathode-precipitating electrodeposition coating having excellent low-temperature curability, said composition consisting essentially of
   (A) 100 parts by weight of a high molecular compound having a molecular weight of 500 to 10,000 and containing carbon-carbon double bonds with an iodine value of 50 to 500 and 30 to 300 millimoles of amino groups per 100 g,
   (B) 10 to 200 parts by weight of a product of reaction of a diglycidyl compound represented by the general formula

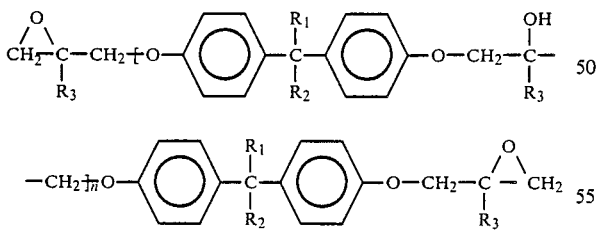

wherein R$_1$, R$_2$ and R$_3$ represent a hydrogen atom or a methyl group and n represents an integer of from 0 to 20, with at least one organic acid component selected from the group consisting of
   (a) both an alpha, beta-unsaturated dicarboxylic acid and an alpha, beta-unsaturated monocarboxylic acid,
   (b) an unsaturated fatty acid containing at least 10% by weight of carbon-carbon conjugated double bonds and having a molecular weight of 100 to 350, and
   (c) an alpha, beta-unsaturated monocarboxylic acid, a 1,2-dicarboxylic acid anhydride represented by the general formula

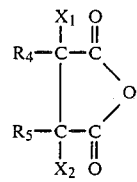

wherein R$_4$ and R$_5$ represent a hydrogen atom or an alkyl group having 1 to 20 carbon atoms, provided that either R$_4$ or R$_5$ may contain one molecule of a carboxylic acid group, and R$_4$ and R$_5$ together may be of a 6-membered ring structure or a heterocyclic structure having a 5-membered ring and a 6-membered ring, said ring structure optionally containing an unsaturated group; and X$_1$ and X$_2$ represent a hydrogen atom, an organic group having 1 to 10 carbon atoms, or a bond, provided that when X$_1$ and X$_2$ are bonds, the carbon atoms to which X$_1$ and X$_2$ are attached will together form a double bond, and a monoepoxy compound represented by the following formula

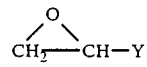

wherein Y represents a hydrogen atom or an organic group having 1 to 10 carbon atoms, in this sequence, and
   (C) 0.005 to 1.0 part by weight as metal of a manganese salt of an organic acid or manganese dioxide.

2. The composition of claim 1 wherein the component (B) is a product of reaction of 1 mole of the diglycidyl compound with 0.2 to 0.8 mole of the alpha, beta-unsaturated dicarboxyilc acid and 1.6 to 0.4 mole of the alpha, beta-usaturated monocarboxylic acid.

3. The composition of claim 2 wherein the alpha, beta-dicarboxylic acid is represented by the general formula $$HO-\overset{O}{\underset{\|}{C}}-\overset{R_6}{\underset{|}{C}}=\overset{R_7}{\underset{|}{C}}-\overset{O}{\underset{\|}{C}}-OH$$

wherein $R_6$ and $R_7$ represent a hydrogen atom or an alkyl group having 1 to 10 carbon atoms, and the alpha, beta-unsaturated monocarboxylic acid is represented by the general formula $$Y-\overset{R_8}{\underset{|}{C}}=\overset{R_9}{\underset{|}{C}}-\overset{O}{\underset{\|}{C}}-OH$$

wherein $R_8$ and $R_9$ represent a hydrogen atom or a methyl group, and Y represents a hydrogen atom, an organic group having 1 to 20 carbon atoms, or a group of the formula $$\overset{R_{10}}{\underset{|}{CH}}=\overset{R_{11}}{\underset{|}{C}}-\overset{O}{\underset{\|}{C}}-O-CH_2-\overset{OH}{\underset{|}{CH}}-CH_2-O-\overset{O}{\underset{\|}{C}}-$$

or a group of the formula $$\overset{R_{10}}{\underset{|}{CH}}=\overset{R_{11}}{\underset{|}{C}}-\overset{O}{\underset{\|}{C}}-O-CH_2-CH_2\overset{}{(}O-CH_2-CH_2\overset{}{)_m}-O-\overset{O}{\underset{\|}{C}}-$$

in which $R_{10}$ and $R_{11}$ represent a hydrogen atom or a methyl group and m represents an integer of from 0 to 10.

4. The composition of claim 2 wherein the alpha, beta-unsaturated dicarboxylic acid is fumaric acid, maleic acid or a mixture of both, and the alpha, beta-unsaturated monocarboxylic acid is acrylic acid, methacrylic acid, crotonic acid, a reaction product of equimolar proportions of fumaric acid and glycidyl acrylate or methacrylate, a reaction product of equimolar proportions of maleic anhydride and hydroxy acrylate or methacrylate, or a mixture thereof.

5. The composition of claim 1 wherein the component (B) is a product of reaction of 1 molecule of the diglycidyl compound with 2.1 to 0.3 moles of the unsaturated fatty acid containing conjugated double bonds.

6. The composition of claim 5 wherein up to 1.80 moles per molecule of the diglycidyl compound of an unsaturated monocarboxylic acid represented by the general formula $$\overset{R_{12}}{\underset{|}{CH}}=\overset{R_{13}}{\underset{|}{C}}-\overset{O}{\underset{\|}{C}}-OH$$

wherein $R_{12}$ and $R_{13}$ represent a hydrogen atom or a methyl group, is used in combination with the unsaturated fatty acid containing conjugated double bonds.

7. The composition of claim 1 wherein the component (B) is a product of reaction of one molecule of the diglycidyl compound with 2 molecules of the alpha, beta-unsaturated monocarboxylic acid, 1 to 4 molecules of the 1,2-dicarboxylic acid anhydride and 1 to 4 molecules of the monoepoxy compound.

8. The composition of claim 7 wherein the alpha, beta-unsaturated monocarboxylic acid is acrylic acid, methacrylic acid or a mixture of both; 1,2-dicarboxylic acid anhydride is phthalic anhydride, trimellitic anhydride, maleic anhydride, 4-methyltetrahydrophthalic anhydride, or a mixture thereof; and the monoepoxy compound is 1,2-butene oxide, allyl glycidyl ether, glycidyl methacrylate, or a mixture thereof.

* * * * *

UNITED STATES PATENT AND TRADEMARK OFFICE
CERTIFICATE OF CORRECTION

PATENT NO. : 4,543,406
DATED : September 24, 1985
INVENTOR(S) : Yutaka OTSUKI, Hiroyoshi OMIKA, Akio OSHIMA, Yoshihiko ARAKI, Yasuyuki TSUCHIYA It is certified that error appears in the above—identified patent and that said Letters Patent is hereby corrected as shown below:

Please insert the following Priority information between items [22] and [51] in the heading of Letters Patent:

Foreign Application Priority Data

Oct. 22, 1983 [JP]   Japan ................58-196936
Oct. 22, 1983 [JP]   Japan ................58-196937
Apr. 14, 1984 [JP]   Japan ................59-73880

Signed and Sealed this

Twenty-eighth Day of January 1986

[SEAL]

Attest:

DONALD J. QUIGG

Attesting Officer   Commissioner of Patents and Trademarks